May 19, 1953　　　LE ROY J. McCOY, JR　　　2,638,857
ICE-CREAM SCOOP
Filed July 10, 1947　　　　　　　　　　　　2 Sheets-Sheet 1
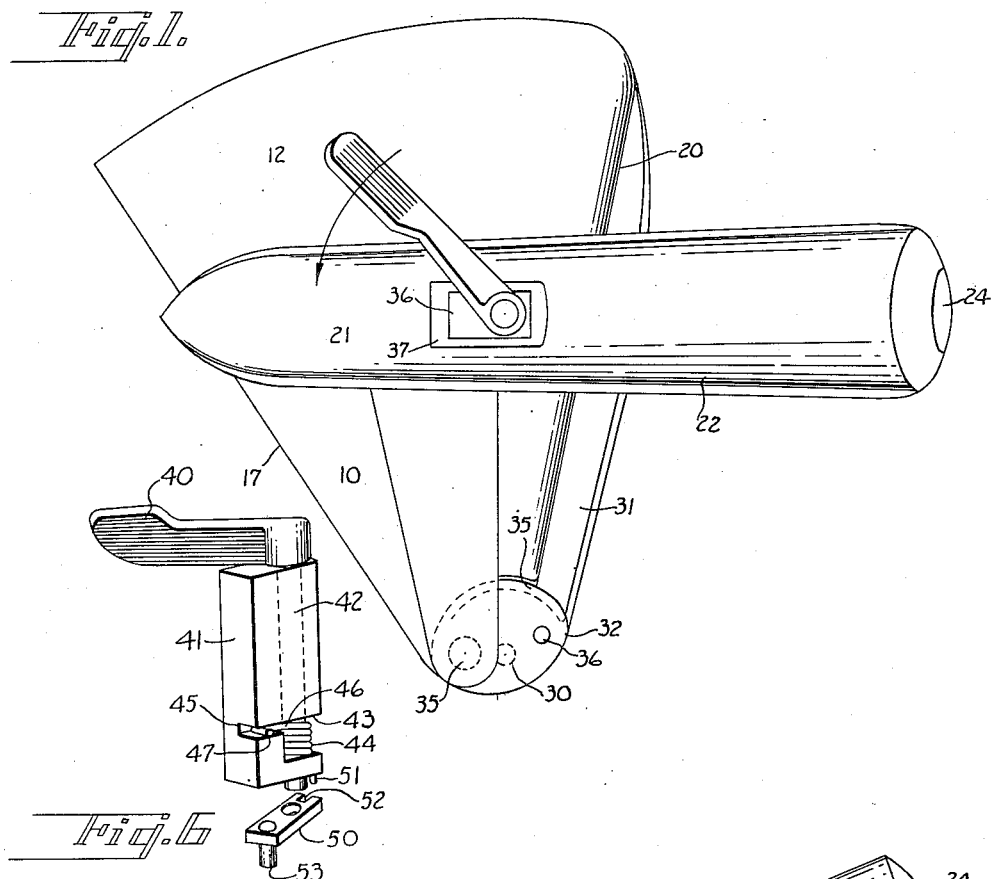
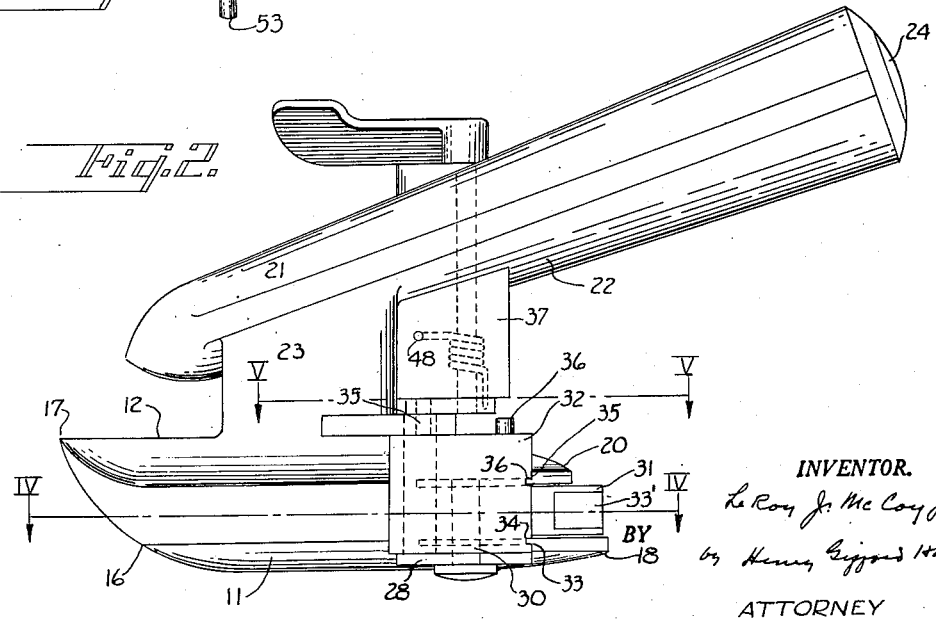
INVENTOR.
Le Roy J. McCoy Jr.
BY Henry Gifford Hardy
ATTORNEY May 19, 1953  LE ROY J. McCOY, JR  2,638,857
ICE-CREAM SCOOP
Filed July 10, 1947                                      2 Sheets-Sheet 2
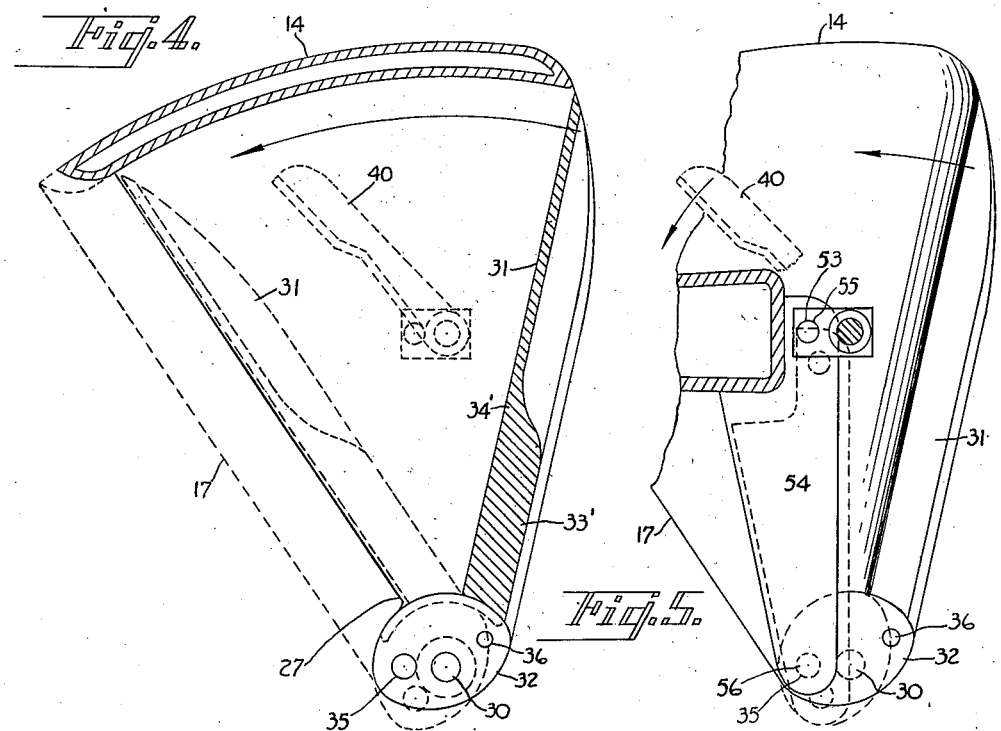
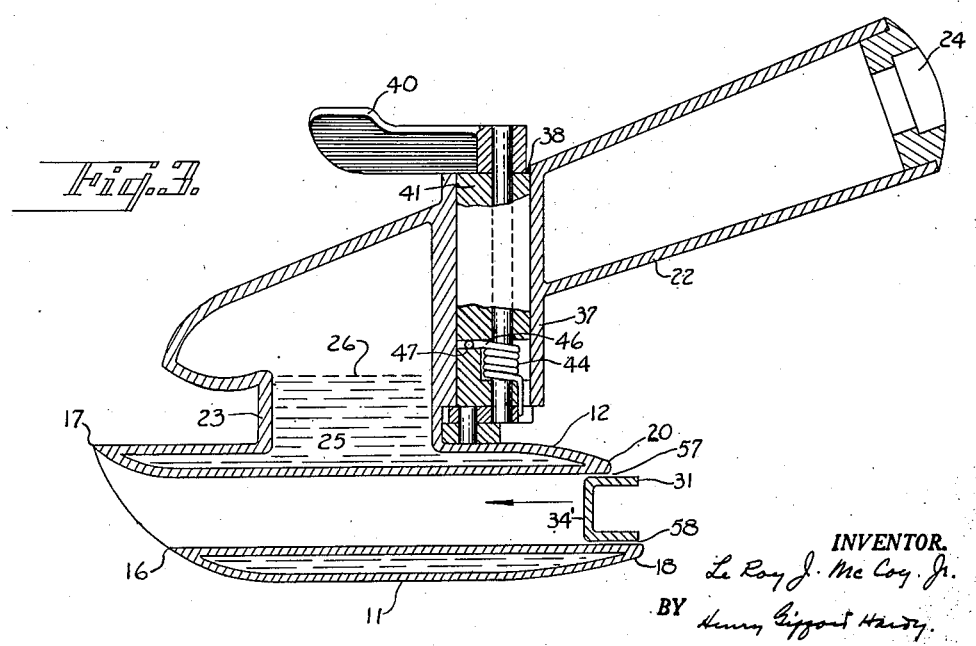
INVENTOR.
Le Roy J. McCoy, Jr.
BY Henry Gippard Hardy
ATTORNEY

Patented May 19, 1953

2,638,857

UNITED STATES PATENT OFFICE 2,638,857

ICE-CREAM SCOOP

Le Roy J. McCoy, Jr., Richmond, Calif.

Application July 10, 1947, Serial No. 760,030

4 Claims. (Cl. 107—48)

The present invention relates to ice cream dispensers or scoops and particularly to scoops for forming slices of ice cream from bulk containers in a la mode servings for pie, or cake, or the like.

At present most of the ice cream dispensed for "pie a la mode" is served in the shape of a ball deposited on the top of the pie sector. Due principally to the shape in which the ice cream is served, it is difficult to eat a small portion of the serving without crushing the upper crust of the pie, or having the ball roll or slide on to the plate. Such ball-shaped ice cream servings are patently unsuited for pies and the like and continue so because the ice cream dispensing tools were designed specifically to fit round cups for fountain servings.

An important object therefore of the present invention is the provision of a device for serving ice cream portions for pie a la mode, or cake a la mode, in flat slices and in the customary wedge shape of the pie or cake sector, instead of the usual balls, and thus promote a greater appetite appeal and demand for such servings.

Up to the present time it has been customary when using the conventional ice cream scoop, to dip it into a jar of water, placed conveniently near the ice cream supply, before each serving. The reason for this unsanitary procedure stems from the simple fact that unless either this or something similar is done, the ice cream will freeze and will adhere to the metal scoop to such an extent that successive servings become difficult, and may even make the release of a single serving difficult. More likely than not, the scoops normally remain partially submerged in the open water jars between servings and although the used water in the jar is replaced with fresh water at intervals, it certainly is not changed often enough. It is inevitable that the water soon becomes mixed with the adhering ice cream and other contaminations. This entire handling of serving scoop is an extremely unappetizing procedure, and distasteful to the average consumer who knows it is being done even though it may not always be observed.

It is therefore an important object of the present invention to eliminate these objectionable features and practices by the provision of a device which does not require dipping in water prior to each serving or soaking in water during the periods when it is not in use.

It is a further object of the present invention to provide a device for serving ice cream which has a low freezing point substance sealed within its walls to prevent the ice cream from adhering or freezing to its surfaces, to assist in the easy delivery of each serving, and to present a smooth, glossy appearance on the surface of each portion.

In the dispensing of ice cream from bulk containers using the presently accepted types of scoops, hills and valleys are formed on the surface because of the digging, scraping and thrusts required to obtain a serving. These unevennesses and loose pieces of ice cream cause air pockets in the subsequent servings to the irritation and annoyance of the customer who is entitled to a full portion. The present invention is particularly designed to do away with this sort of customer complaint and at the same time speed the number of servings which can be made per unit of time.

Still another object of the present invention is to provide an ice cream dispensing device which because of its unique design will swiftly pack the serving of ice cream tightly into a solid slab and thus deliver a full, palatable portion at each serving.

Another object of the invention is to produce a scoop which is shaped to conform with and follow the arc of the bulk container wall. In this manner the ice cream is removed evenly and neatly from the bulk container, substantially eliminating loss and waste from ice cream adhering to the wall.

Further objects are to provide a construction of maximum simplicity, economy and ease of assembly and disassembly for cleaning purposes, also such further objects, advantages and capabilities as will fully appear and as are inherently possessed by the device and invention described herein.

The invention further resides in the combination, construction and arrangement of parts illustrated in the accompanying drawings, and while there is shown therein a preferred embodiment, it is to be understood that the same is illustrative of the invention, and that the invention is capable of modification and change and comprehends other details of construction without departing from the spirit thereof, or the scope of the appended claims.

Referring now to the drawings:

Figure 1 is a top plan view of the device of the present invention showing the general arrangement of the several parts.

Figure 2 is a side elevation of Figure 1, with certain concealed members being shown in dotted lines.

Figure 3 is a vertical section taken on the line III—III of Figure 1 and looking in the direction of the arrows.

Figure 4 is a horizontal section taken on line IV—IV of Figure 2 showing the ejector arm in normal position in full lines and its ejecting position in broken lines.

Figure 5 is a fragmentary sectional plan view taken on line V—V of Figure 2 showing the linkage between the thumb lever on the handle and the ejector arm within the scoop.

Figure 6 is an expanded perspective view of the ejector mechanism removed from its housing.

In the drawings, wherein like characters of reference designate corresponding parts throughout the several views, the body portion or shell 10 of the device of the present invention consists of two spaced pie shape members 11 and 12 joined together along the arc of the sector by a vertical arcuate wall 14. The lower sector 11 is substantially identical in shape with the upper sector 12 except that they are staggered, the upper sector 12 being slightly in advance of the lower sector 11. The two sectors 11 and 12 instead of being solid in construction are hollow and their internal cavities communicate freely with each other through the arcuate wall 14 which is likewise hollow. In this manner the body portion or shell 10 provides a pie shape space between the two sectors, which is closed only by the wall 14 along the arcuate side. The arc of the double wall 14 is precisely that of the inner face of the conventional bulk ice cream container or can which is the same for both gallon and five gallon containers.

On both of these sectors 11 and 12, being double walled, the leading or front edge is closed and curved upwardly in each instance to provide cutting edges 16 and 17 respectively. The trailing edges of each sector are also closed and curved, except that in this instance both trailing edges 18 and 20 are curved toward each other. In other words the trailing edge 20 is directed downwardly and the trailing edge 18 is directed upwardly.

Mounted on the top surface of the pie shape sector 12 and at an acute angle with respect to the plane of the leading or cutting edge 17, is the handle assembly generally designated 21. The handle 22 extends upwardly at an angle from and is supported by a vertical pedestal 23 arising out of the upper wall of the sector 15 and perpendicular to the plane thereof. In this manner a convenient hand grip is provided. The angularity of the handle 22 with respect to the plane of body portion 10 and the line of the leading edges 16 and 17, enables the user to bring considerable pressure to bear on the leading edges 16 and 17 in making a serving. Also the location and positioning of the handle 22 makes it easy to follow the inner cylindrical surface of the container with a natural turning motion of the device. The pedestal 23 and the handle 22 are both hollow and in communication with each other as is shown in Figure 3. The interior of sector 12 is in open and free communication with the interior of pedestal 23 and handle 22 so that liquid or other suitable material is free to travel from the handle through the pedestal, through sector 12, through arcuate wall 14 to the lower sector 11, and vice versa.

The upper or gripping end of the handle 22 is closed with a plug 24. It will be observed that the opening which is sealed by the plug 24, provides a means for supplying the interior cavities of the device, in the first instance, with a suitable material having a low freezing point and here shown as a liquid refrigerant 25 such as Freon. Normally the plug 24 is driven into place so that there will be no leakage, evaporation or other escape. However, the plug may be removed for another charge of refrigerant 25, if the need arises. The device operates with efficiency if the space is not filled beyond the level 26 as indicated.

Toward the apex 27 of the lower pie shaped sector 11 the double walled member becomes a single flat bearing surface 28. It is pierced vertically by a stationary fulcrum pin 30 which forms the pivot for the ejector arm 31 which is preferably integral with and extends from the ejector hub 37, and normally lies adjacent and between the trailing edges 18 and 20 of both segments 11 and 12 substantially closing the chamber between the two along the trailing edges. The lower sector 11 toward the apex 27 is provided with an arcuate guide 33 which fits into and rides within a groove 34 cut on the inner vertical face of the ejector hub 32 adjacent its lower bearing surface. Similarly the double walls of the upper sector 12 are brought together to form an arcuate guide 35 near its projected apex, which fits into and rides in a groove or slot 36 cut in the inner vertical face of the ejector hub 32 near its upper surface. In the complete assembly of the device, these guides 33 and 35 and slots 34 and 36 serve to prevent the open or free ends of the sectors 11 and 12 from spreading when the device is forced into or against the ice cream mass in a container and also function to hold the ejector arm 31 free from contact with the smooth inner faces of sectors 11 and 12.

As stated above the ejector 31 is an arm extending substantially tangentially from the hub 32, at the apex of the sectors and in its normal position, substantially closes the chamber between the sectors along the trailing edge. The arm or blade 31 may be U-shaped for lightness with reinforcement 33' as it approaches the hub 32. The foot 34' of the U-shaped arm faces inwardly with respect to the chamber formed by the body sectors, and is the pushing surface for the ejection of the serving. The hub 27, which is an irregular ovoid, is drilled on its upper surface at 35 to receive the excentric crank pin 50 and at the opposite side is provided with stop pin 36.

To the rear of the pedestal 23 and preferably integral therewith is a rectangular housing 37 which passes up through the handle and projects just slightly above it. This housing has a rectangular axial bore 38 to accommodate and enclose a portion of the ejector operating mechanism. As will be observed in Figures 2 and 3, the housing 37 does not extend to the upper surface of sector 12 but stops short to provide space for certain linkages hereinafter described. The axial bore 38 does not communicate with the fluid cavities within handle 22 or pedestal 23 but on the contrary is sealed from such communication. The housing 37 however does not block the flow or passage in handle 22 as is clearly shown in Figure 1.

The ejector mechanism which operates in response to pressure on the thumb lever 40 to move the ejector arm or blade 31 forward around pivot pin 30 to describe the arc of the sector, fits in the rectangular bore 38 of housing 37. Figure 6 shows this mechanism removed from the housing. It consists of a rectangular block 41 which has dimensions calculated to fit comfortably within the said rectangular bore 38. The block is drilled longitudinally to receive a stem 42 rotatable therein. The upper end of stem 42 projects beyond the block and is secured in any suitable manner to the thumb lever 40 at the appropriate angle so that pressure on the thumb lever will rotate the stem 42. Near the lower end of the said block a recess 43 is provided in the path of the drilling for the stem 42 sufficient to retain the coil spring 44 and still remain within the outer dimensions of the block. It will be noted that when the spring 44 is in position the stem 42 passes axially through it and helps to retain its position and form. A lateral cut 45 is made in block 41 to receive one of the free ends 46 of the spring 44. The tip 47 of end 46 is turned at right angles to the longitudinal axis of the block 41 and is of sufficient length to project slightly when tension is put on the spring 44. The turned tip 47 of end 46 is calculated to register in the lateral hole 48 drilled through the wall of the housing 37. When the ejector mechanism is in place in its housing it cannot be moved vertically because of this locking.

Positioned just below block 41 and its housing 37, is linkage member 50 which is secured to the lower end of stem 42 and is substantially the same in sectional areas as the block 41. The other free end 51 of spring 44 is bent downwardly through a groove in the face of block 41 and is retained in notch 52 in the linkage 50. A crank pin 53 is secured in member 50 and projects downwardly. Between the linkage member 50 and the upper surface of segment 12 is linkage member 54, best viewed by reference to Figure 5. It is provided at its inner end with hole 55 which is adapted to receive crank pin 53. At its outer end crank pin 56 is secured, fitting into the corresponding hole 35 in hub 32. On the forward side of linkage member 54 adjacent the inner end it is cut away to abut two sides of the pedestal 23. Thus, in the position of rest, shown in full lines in Figure 5, any force applied to the face 34′ of the ejector arm 31 would be resisted by the bracing and locking of this linkage against the two faces of the pedestal.

The manner of using the device of the present invention is easy and reliable. The operator using the device simply grasps the handle 22 in a natural, comfortable manner and in so doing the thumb of the right hand naturally rests against the surface of the thumb lever 40. It is not necessary to first dip the device in water as it remains relatively warm, even in direct contact with the frozen material, due to the low freezing point material 25 within the hollow walls. In this position the device is advanced into the ice cream container and is pushed in a substantially horizontal plane with an arcuate motion with the outer surface of the arcuate wall 14 substantially engaging the curved surface of the ice cream container. As the device is passed around the container in this manner, the upwardly curving advancing edges 16 and 17 will tend to cause the device to rise at the front. The angle of the handle however will tend to cause a greater pressure at the forward edge and produce the necessary cut or shearing action. The ice cream is principally cut by the lower edge 16 and the forward motion along this edge causes the ice cream to enter the chamber between the two sectors 11 and 12. Ice cream will be received into this chamber due to the forward movement until it is packed solidly against the inner face 34′ of the ejector arm 31. The spaces 57 and 58 between the upper and lower surfaces of the ejector arm 31 and the upper and lower inner faces of the sectors 12 and 11, will permit the escape of any entrapped air and so the serving of ice cream will be packed solidly within the receiving chamber without further ado. It is apparent that the serving conforms to the shape of the sectors and is flat.

The filled device is then removed from the ice cream container. The serving is released when the operator presses the ejector lever 40 with his thumb. The pressure so exerted causes the ejector lever 40 to advance counterclockwise in the direction of the arrow. The advancing of this lever rotates stem 42 and since linkage member 50 is attached at the lower end, this likewise rotates. Since spring end 51 is retained in linkage 50, the rotation is against the pressure of spring 44. Crank pin 56 moves in an arc in a horizontal plane, causing linkage 54 to move outwardly and away from its position of repose as shown in broken lines in Figure 5. With this motion the force is directed through the rotatably mounted crank pin 56 against the pivot pin 30 rigidly mounted on the bearing surface 28 causing the hub 32 to move about said pivot pin 30. Since the crank 30 is excentric and engages on the opposite side of the hub from the ejector arm 31, the rotation of the hub is such as to cause the ejector arm 31 to pass through between the inner surfaces of sectors 11 and 12 and dispense or eject the serving of ice cream therefrom. The forward movement of the ejector arm 31 is stopped just as it passes the entering edge 16 in the position shown in Figure 4, by the movement of linkage 54 being stopped by abutting against pin 36 projecting from the upper surface of hub 32.

The ejection of the ice cream is in a perfect pie shape sector of uniform thickness. The ejection is further rendered easy, effortless and attractive because of the presence of the fluid refrigerant contained within the device. Because of the heat exchange relationship with the low freezing point material, the main parts of the device, including the handle, are prevented from ever reaching a freezing temperature so that when the ice cream is dispensed from the device, the melting on the upper and lower surfaces thereof, in addition to making ejection easy will give the serving a smooth, glossy, attractive appearance.

After dispensing the serving, the pressure on thumb lever 40 is released and the ejector arm 31 is returned immediately to its position of repose, ready for the next use, by the spring 44. It is understood that other spring means may be utilized for returning the ejector to its normal position and also that the lever for operating the ejector may be placed directly on the hub of the ejector arms without departing from the spirit of the invention.

When it is desirable to clean the scoop it may be immersed in boiling water without disassembly, as all parts are rust proof. Any possible danger as the result of pressures due to expansion of the low melting point material may be eliminated by evacuating the handle 22 at the time the charge of the material is placed therein. When it is desirable to disassemble the scoop for a more thorough cleaning as required by health laws in many States, all that is then necessary is to depress the end 47 of spring 44 through the opening 48 of housing 37 by means of an ice pick or other pointed tool at hand, while at the same time pulling upwardly on the lever 40 and the ejector mechanism. When the end 47 is disengaged from opening 48 the entire ejector operating assembly may be withdrawn upwardly from housing 37 and can be cleaned as a unit. Next the link 54 is removed from hub 32. The ejector arm 31 and hub 32 are then removed by simply turning the ejector blade forward, clear of the forward edges 16 and 17 and clear of guides 33 and 35. The hub and its integral arm may then be lifted off its fulcrum pin 30.

It is to be further observed that a structure of any shape or size with hollow walls providing a sealed chamber for a suitable low freezing point material can be used conveniently. In this manner any size and shape of ice cream dispensing device may deliver the product with the same ease and attractive appearance as the one illustrated.

Although ice cream has been continuously referred to as illustrating the use of the invention, it is to be understood that it is equally effective in the dispensing of any frozen comestible and that the phrase "ice cream" is not by way of limitation but merely by way of illustration. Similarly, the words "liquid refrigerant" and "low freezing point material" are by way of specific examples, and it is contemplated that any suitable material with a relatively low freezing point may be used, whether a liquid, gas or solid.

I claim:

1. A dispenser of the character disclosed, comprising in combination two spaced double-walled sector-shaped members, an arcuate double wall joining said spaced members forming a receptacle for a serving, said double-walled sectors and said arcuate wall forming a communicating hollow chamber, a hollow handle mounted on the upper sector-shaped member with the hollow interiors of each communicating, a low freezing point medium confined within said hollow chambers, ejector means between said spaced sector-shaped members to close one side during filling of the receptacle and means to move the ejector means between the spaced sector-shaped members to clear the receptacle.

2. A dispenser of the character disclosed designed for use substantially in a horizontal plane, comprising in combination two spaced double-walled sector-shaped members, an arcuate double wall joining said spaced members forming a receptacle for a serving, said double walled sectors and said arcuate wall forming a communicating hollow chamber, a hollow handle mounted on the upper sector-shaped member with the hollow interiors of each communicating, said handle being mounted at an angle and upwardly with respect to the plane of said upper sector-shaped member, a low freezing point medium confined within said hollow chambers, ejector means between said spaced sector-shaped members to close one side during filling of the receptacle and means to move the ejector means between the spaced sector-shaped members to clear the receptacle.

3. An ice cream dispenser adapted to dispense a sector-shaped layer of ice cream comprising in combination, a pair of spaced hollow walled sector-shaped members, a hollow arcuate wall joining said members, a low freezing point medium confined within said hollow wall and said members, a handle mounted on the upper surface of the top sector-shaped member upwardly and at an angle to the plane of said surface, ejector means between said sector-shaped members normally adjacent the rear edge thereof, and means for advancing the ejector means to dispense the sector-shaped layer of ice cream and return it to its normal position.

4. An ice cream dispenser adapted to dispense a sector-shaped layer of ice cream comprising in combination, a pair of spaced hollow walled sector-shaped members, a hollow arcuate wall joining said members, a low freezing point medium confined within said hollow wall and said members, said hollow interiors being in open communication, a substantially hollow handle mounted on the upper surface of the top sector-shaped member upwardly and at an angle to the plane of said surface, the interior of which communicates with the hollow interior of said surface, ejector means between said sector-shaped members normally adjacent the rear edge thereof and pivotally mounted at the apex of said sector-shaped members, and means for pivotally advancing the ejector means to dispense the sector-shaped layer of ice cream and return it to its normal position.

LE ROY J. McCOY, Jr.

References Cited in the file of this patent

UNITED STATES PATENTS

| Number | Name | Date |
|---|---|---|
| 1,255,906 | Miller | Feb. 12, 1918 |
| 1,607,765 | Levy | Nov. 23, 1926 |
| 1,688,595 | Parr | Oct. 23, 1928 |
| 1,769,218 | Garvis | July 1, 1930 |
| 1,798,490 | Parr | Mar. 31, 1931 |
| 2,160,023 | Kelly | May 30, 1939 |
| 2,171,606 | Schultz | Sept. 5, 1939 |